Oct. 24, 1933.     G. A. MOHR     1,931,801
LATHE APRON MECHANISM
Filed July 12, 1932     2 Sheets-Sheet 1

George A. Mohr
INVENTOR

BY Murray and Zugelter
ATTORNEYS

Patented Oct. 24, 1933

1,931,801

UNITED STATES PATENT OFFICE 1,931,801

LATHE APRON MECHANISM

George A. Mohr, Cincinnati, Ohio, assignor to The Boye and Emmes Machine Tool Company, Cincinnati, Ohio, a corporation of Ohio Application July 12, 1932. Serial No. 622,101

7 Claims. (Cl. 82—22)

This invention relates to improvements in a machine tool and especially to the mechanism thereof which controls the tool and carriage feed.

An object of the invention is to provide a carriage and apron structure the parts of which are so designed that they may be assembled or replaced inexpensively, with the expenditure of a minimum of time and labor.

Another object is to provide a construction of clutch actuating means wherein there is eliminated all strain and thrust upon the apron and carriage frame when the clutch lever is actuated for engaging the clutch elements.

A further object is to secure extreme smoothness of operation and a reduction in wear of the actuating means of the feed clutch.

The foregoing and other objects are attained by the means described herein and disclosed in the accompanying drawings, in which.

Figures 1, 3, 4, 5:
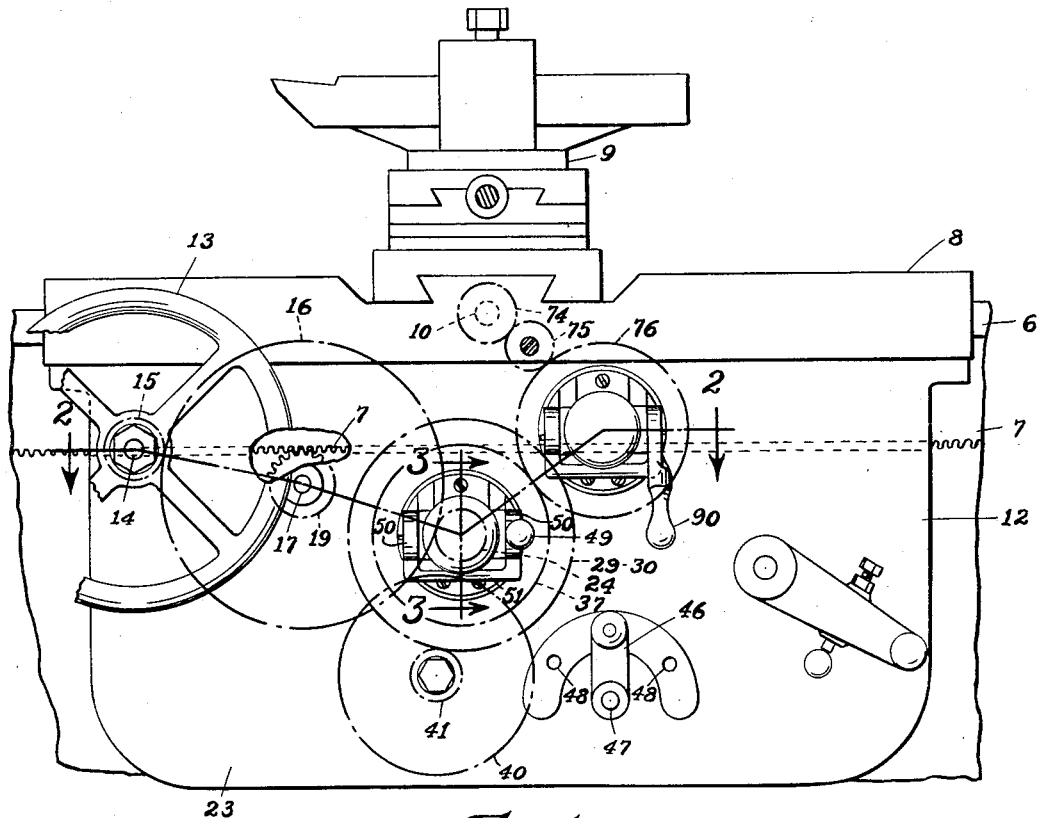
Fig. 1 is a fragmental front elevational view of a lathe carriage and apron embodying the invention.
Fig. 3 is a cross-sectional view taken on line 3—3 of Fig. 1.
Fig. 4 is an end elevational view of a cam and camshaft forming a detail of the invention.
Fig. 5 is a side elevational view of the cam and camshaft of Fig. 4.

In order that a clear and complete understanding of the present invention may be conveyed, there is shown and described herein a portion of an engine lathe to which the invention is applicable. The lathe comprises the usual bed 6 on which is mounted a stationary toothed rack 7 that extends longitudinally of the lathe bed. The bed supports a carriage 8 upon which is mounted a tool holder 9 that may be moved longitudinally with the carriage, and which is provided with suitable means for moving the tool holder transversely thereof. Said means comprises the usual cross feed screw shaft 10.

Fixed to the carriage and depending therefrom is an apron 12, which provides mounting means for the various longitudinal and cross feed control devices. As is clearly indicated in Fig. 1, the carriage is movable longitudinally of the bed by means of a hand wheel or the like 13 which is fixedly mounted upon a hand wheel shaft 14 that carries a fixed pinion 15 adapted for constant engagement with a reduction gear 16. Gear 16 is mounted upon a rack pinion shaft and is fixed against relative movement thereon by any suitable means such as a key 18. The rack pinion 19 engages the rack 7, and may be integral with or otherwise suitably fixed relative to the shaft or spindle 17. The shaft or spindle 17 receives support from suitable bearings 20 and 21 which are carried by the rear and front plates 22 and 23, respectively, of the apron. From the foregoing it will be readily apparent that rotation of the hand wheel 13 effects traversing of the carriage along the bed by reason of the geared connection that includes the rack and pinion.

It is to be observed that the reduction gear 16 is in constant meshing relationship with a clutch spindle pinion 24, which may be integral with or otherwise fixed relative to a clutch spindle or shaft 25 that has rotational movement within a suitable bearing 26 provided in the rear plate 22 of the apron. By means of a key or the like 27, a clutch member or clutch cone 28 is fixed to the shaft for movement with the pinion 24. The clutch cone is adapted to cooperate with a complementary clutch member 29 which may be in the form of a gear having external teeth 30, and having a tapered inner recess 31, of a proper degree of taper for reception of the cone member 28. The members 28 and 29 constitute the frictional clutch means whereby the carriage may be power traversed longitudinally of the lathe bed.

It is to be observed that the clutch member 29 is provided with an integral hub 32 having a central bore 33 for reception of the clutch spindle 25, and said hub is journalled for rotation in a bushing or bearing 34 that is supported by the front plate 23 of the apron. The shaft 25 may rotate freely within the bore of the hub, and the hub in turn may rotate freely in the bushing 34.

In order that power from the power shaft 35 may be transmitted to the tool holder traversing clutch, which is indicated generally by the character 36, the member 29 carries a power transmission gear 37 which is adapted to mesh with the gear 38 of the clutch means 36. Gear 37 may be keyed or otherwise fixed for rotation with the clutch member 29.

The power drive for the clutch member 29—30 comprises the train of gears 39, 40 and 41, gear 40 being a large bevel gear which is fixed upon a shaft 42 suitably journalled in the rear plate of the apron. Said shaft also has fixed thereto the small pinion 41 which transmits power from the bevel gear to the clutch gear member 29—30. The bevel gear 40 is adapted to be selectively engaged by either of the bevel pinions 39 or 43, both of which pinions are adapted to be splined upon the power shaft 35 as at 44 and moved longitudinally thereof by means of any approved type of shift lever 45 that may be rocked backward and forward by means of a shaft handle 46 located exteriorly of the apron and preferably upon the front face thereof. The shift lever may be in the form of a crank which is fixed to one end of the shift lever shaft 47, the other end of which carries the manipulating handle 46.

Shift means such as is briefly described above, ordinarily are provided with stops 48 which are arranged to hold the shift lever in different positions of adjustment. It should be readily evident that engagement of the gear 40 by the bevel pinion 39 will effect rotation of the clutch member 29 in one direction of rotation, whereas, movement of the bevel pinion 43 into engagement with the bevel gear 40 will effect rotation of the clutch member in the opposite direction.

Movement of the clutch members 28 and 29 to engaged and dis-engaged positions is effected by means of a control lever 49. The control lever comprises a pair of spaced parallel arms 50 which are held in their spaced parallel relationship preferably by means of a integral tie or cross member 51 which assumes a position below the axis of the clutch shaft or spindle 25, as is clearly indicated in Fig. 3. Each of the arms 50 is provided with a perforation or opening 52, these openings being adapted for reception of the outermost ends of a pair of double faced cams, the cams being indicated by the characters 53 and 54. The cams each include the short integral cam shafts 55 and 56. By means of any suitable devices such as keys 57, the shafts of the cams are rigidly fixed in relation to the arms 50 of the control lever 49. The cams are so constructed that upon movement of the control lever to the horizontal position of Fig. 3, the clutch spindle or shaft 25 is moved outwardly while at the same time the hub 32 is moved inwardly, thereby causing the clutch members 28 and 29 to frictionally engage one another. It will be readily apparent, therefore, that no strain or wear is imposed upon the bearings 58 of the bracket 59, which bearings support the shafts of the cams. Consequently, engagement of the clutch imposes no lateral strain upon the front face 23 of the apron whereby to distort it and cause any tightening thereof upon the shoulders or hubs of the various shafts or gears which are disposed between the front and rear plates. In other words, there is provided a floating clutch actuating mechanism. The outermost faces 60 and 61 of the eccentric cam faces 62 and 63, respectively, are adapted to respectively engage the thrust bearings 64 and 65 which are mounted concentrically upon the clutch shaft and are preferably of an anti-friction type. The thrust bearing 64 is arranged to abut the outermost end 66 and hub 32, while the thrust bearing 65 is adapted to abut an adjusting nut 67, which is threaded, as at 68, upon the outer end of the clutch spindle or shaft. The nut 67 preferably is locked in adjusted positions by means of the lock nut 69. The thrust bearings, cams, and nuts 67 and 69 are all protected from entry of chips and other foreign substances by means of an extending housing 70 which may be fastened to the bracket 59 by any suitable means such as screws 71. Screws or the like 72 are provided for securing the bracket to the front plate 23 of the apron.

Figure 2:
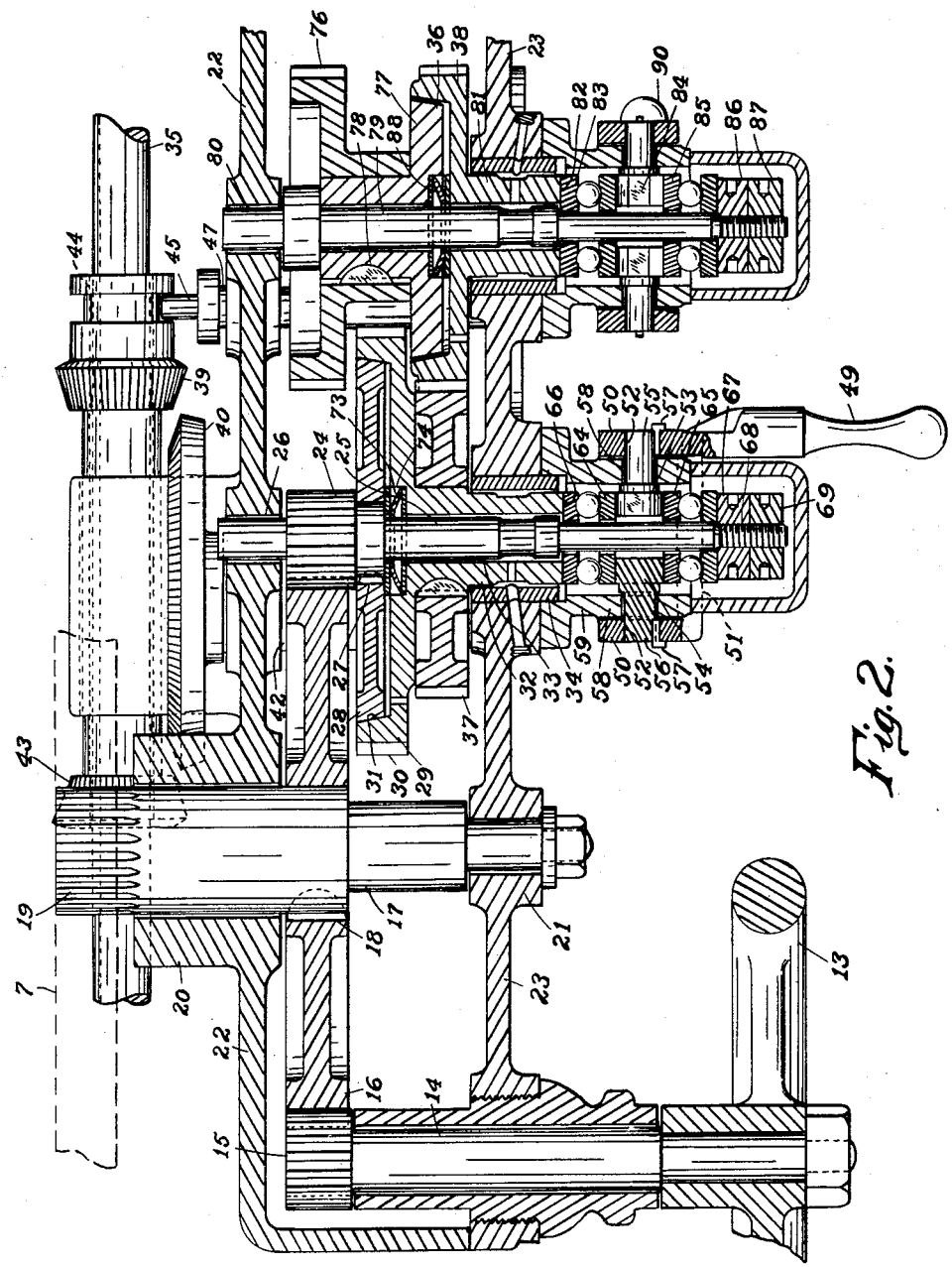
Fig. 2 is a cross-sectional view taken on line 2—2 of Fig. 1.

A flat spring 73 (see Fig. 2) which is received in a suitable recess 74 of the clutch member 29, provides for yieldingly returning the clutch elements to dis-engaged position, when the lever 49 is moved downwardly to the clutch disengaged position. Upon movement of the lever 49 to said lowered position, the cams are rotated so as to permit the thrust bearings 64 and 65 to move toward one another along the spindle or shaft 25, this movement being imparted by the flat or disc shaped spring 73. The use of double cams, one on each side of the spindle, has the effect of precluding rotation of the races of the thrust bearings which are contacted by the cams, thereby precluding wear of the cam faces. Furthermore, the independent spreading action imparted by the cams to the thrust bearings relieves the bracket 58 and the apron to which it is attached, of all compressive forces such as would result in a structure wherein the cams act directly upon the outer face of the apron or any part connected thereto.

As is most clearly shown in Fig. 1, the cross feed screw shaft 10 is adapted to be rotated by means of a series of intermeshing gears 74, 75 and 76, gear 76 being associated with the clutch 36 (see Fig. 2) for selective rotational movement in clockwise or counter clockwise direction of rotation. Gear 76 is fixedly secured to the cone or internal clutch member 77 by any suitable means such as the key 78, so as to rotate therewith. The clutch 36 may be referred to as the cross feed clutch, and the members of the clutch are mounted concentrically upon the cross feed spindle or shaft 79, which is supported in a bearing 80 of the rear apron plate 22. The combination gear and clutch element 38 is provided with a hub 81 which is similar to the hub 32 of the carriage traversing clutch member 29, and said hub 81 has, in abutment with its end 82, the thrust bearing member 83. Intermediate the thrust bearing and a second thrust bearing 85 is a cam structure 84 that is exactly similar to the cam structure of the carriage traversing clutch control. The adjusting nuts 86 and 87 correspond to the adjusting nuts 68 and 69, respectively, and all other parts of the cross feed clutch control which are outwardly of the hub 81, are exactly similar to the parts of the carriage traversing clutch control. Like the clutch previously described, the clutch 36 includes the disc shaped spring 88 which yieldingly urges apart the clutch members 38 and 77, and it is operated by means of an actuating lever arrangement 90 identical with that indicated at 49.

By means of the construction herein disclosed and described, the thrust bearings and the cams, as well as the adjusting means for the clutch control, are located outside the apron and therefore are readily accessible and capable of quick replacement and inspection without dismantling the apron. The elimination of all strain and force on the outer wall or plate of the apron, when the cams are moved to the clutch engaging position, insures free rotational movement of all parts between the apron plates because the plates cannot be sprung inwardly so as to bind the various shafts and gears, even though they be fitted between the plates without an appreciable amount of clearance. The close fitting of parts thereby made possible results in a reduction of endplay of the various shafts and gears, which reduces leakage and waste of lubricant and provides for smoother non-jarring clutching and de-clutching. The bad effects of play in the carriage traversing and tool feeding mechanism is known to all machinists, and its damaging effects are particularly noticeable when the machine is used for gear or screw cutting. Carriage traversing and tool feeding apparatus constructed in accordance with the invention are free of the above mentioned common faults found in existing machines, and the improvement is accomplished with a reduction in the cost of manufacture.

It is to be understood that various modifications and changes in structural details of the device may be made, within the scope of the appended claims, without departing from the spirit of the invention.

What is claimed is:

1. A machine tool having in combination a bed and a carriage supported for movement thereon longitudinally of the bed, an apron plate fixed relative to the carriage for movement therewith, a power shaft and means including a clutch associated with the carriage and power shaft for moving the carriage by power along the bed, and in which the clutch comprises an axially movable rotatable clutch shaft, a clutch member fixed thereon, a complementary clutch member having a bored hub loosely fitting about the clutch shaft, said hub having a free bearing end, an abutment near one end of the clutch shaft, spaced thrust bearings disposed adjacent to the free bearing end of the hub and the abutment of the shaft, each of which thrust bearings comprises a pair of relatively rotatable races, a pair of double faced eccentrics disposed intermediate the thrust bearings and in contacting relationship with one of the races of each thrust bearing, the eccentrics being disposed at opposite sides of the clutch shaft so as to bear upon the races at substantially diametrically opposite points, and means for rotating the eccentrics in unison to spread apart the thrust bearings.

2. A machine tool having in combination a bed and a carriage supported for movement thereon longitudinally of the bed, an apron plate fixed relative to the carriage for movement therewith, a power shaft and means including a clutch associated with the carriage and power shaft for moving the carriage by power along the bed, and in which the clutch comprises an axially movable rotatable clutch shaft, a clutch member fixed thereon, a complementary clutch member having a bored hub loosely fitting about the clutch shaft, said hub having a free bearing end, an abutment near one end of the clutch shaft, spaced thrust bearings disposed adjacent to the free bearing end of the hub and the abutment of the shaft, each of which thrust bearings is located exteriorly of the apron plate and comprises a pair of relative rotatable races, a pair of double faced eccentrics disposed intermediate the thrust bearings and in contacting relationship with one of the races of each thrust bearing, the eccentrics being disposed at opposite sides of the clutch shaft so as to bear upon the races at substantially diametrically opposite points, and means including a lever having spaced arms between which the eccentrics are securely held for rotating the eccentrics in unison to spread apart the thrust bearings.

3. A machine tool having in combination a bed and a carriage supported for movement longitudinally of the bed, an apron plate fixed relative to the carriage, a power shaft and means including a clutch associated with the carriage and power shaft for moving the carriage by power along the bed, and in which the clutch comprises a clutch shaft movable axially and rotatably, a pair of relatively movable engageable clutch elements, and a floating clutch actuating means receiving support from the apron plate but arranged to effect engagement of the clutch members without translation of force laterally upon the apron plate.

4. A machine tool having in combination a bed and a carriage supported for movement longitudinally of the bed, an apron plate fixed relative to the carriage for movement therewith, a power shaft and means including a clutch associated with the carriage and power shaft for moving the carriage by power along the bed, and in which the clutch comprises an axially and rotatably movable clutch shaft, a clutch member fixed thereon, a complementary clutch member having a bored hub loosely fitting about the clutch shaft, said hub having a free bearing end, an abutment near one end of the clutch shaft, a double faced eccentric disposed intermediate the free bearing end of the hub and the clutch shaft abutment, and means for rotating the eccentric whereby to increase the distance between the clutch shaft abutment and the said hub end without application of force laterally upon the apron plate.

5. A machine tool carriage having in combination therewith spaced front and rear apron walls, a clutch shaft having one end thereof journalled in the rear wall for axial and rotational movement and having at its other end an adjustable abutment disposed exteriorly of the front apron wall, clutch elements carried by the shaft between the apron walls, eccentric means located exteriorly of the front wall for effecting relative movement of the clutch members to the engaged position, and a pair of thrust bearings for the shaft, said thrust bearings both being carried by the shaft and located exteriorly of the front apron wall and arranged to be jointly influenced and contacted by the eccentric means.

6. A machine tool carriage having in combination therewith spaced front and rear apron walls, a clutch shaft having one end thereof journalled in the rear wall for axial and rotational movement and having at its other end an adjustable abutment disposed exteriorly of the front apron wall, clutch elements carried by the shaft between the apron walls, eccentric means located exteriorly of the front wall for effecting relative movement of the cluth members to the engaged position, and a pair of thrust bearings for the shaft, said thrust bearings both being carried by the shaft and located exteriorly of the front apron wall and arranged to be jointly influenced and contacted by the eccentric means, one of said thrust bearings being in contact with the abutment of the shaft and the other being in abutment with a portion of one clutch element exteriorly of the front apron wall.

7. A machine tool carriage having in combination therewith spaced front and rear apron walls, a clutch shaft having one end thereof journalled in the rear wall for axial and rotational movement and having at its other end an adjustable abutment disposed exteriorly of the front apron wall, clutch elements carried by the shaft between the apron walls, eccentric means located exteriorly of the front wall for effecting relative movement of the clutch members to the engaged position, and a pair of thrust bearings for the shaft, said thrust bearings both being carried by the shaft and located exteriorly of the front apron wall and arranged to be jointly influenced and contacted by the eccentric means, one of said thrust bearings being in contact with the abutment of the shaft and the other being in abutment with a portion of one clutch element exteriorly of the front apron wall, and a pair of diametrically opposite similar cam faces on the eccentric for jointly forcing the thrust bearings in opposite directions lengthwise of the shaft.

GEORGE A. MOHR.